US008026920B2

(12) United States Patent
Smith et al.

(10) Patent No.: US 8,026,920 B2
(45) Date of Patent: Sep. 27, 2011

(54) EXTENSIBLE VISUAL EFFECTS ON ACTIVE CONTENT IN USER INTERFACES

(75) Inventors: Adam M. Smith, Sammamish, WA (US); Robert A. Wlodarczyk, Redmond, WA (US); Biliana K. Kaneva, Redmond, WA (US); Eduardo M. Maia, Redmond, WA (US); Patrick J. Sweeney, Redmond, WA (US); Rahul V. Patil, Redmond, WA (US); Sriram Subramanian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 990 days.

(21) Appl. No.: 11/457,711

(22) Filed: Jul. 14, 2006

(65) Prior Publication Data

US 2007/0061744 A1    Mar. 15, 2007

Related U.S. Application Data

(60) Provisional application No. 60/716,735, filed on Sep. 13, 2005.

(51) Int. Cl.
*G09G 5/02* (2006.01)
*G09G 5/00* (2006.01)
*G06T 11/20* (2006.01)
*G06T 1/00* (2006.01)
*H04N 1/46* (2006.01)

(52) U.S. Cl. ........ 345/522; 345/592; 345/618; 345/440; 345/629; 345/537; 382/282; 382/276

(58) Field of Classification Search .................. 345/557, 345/581–582, 592–594, 618–619, 626–629, 345/440, 501–506, 519–522, 549; 382/239, 382/248, 276, 282, 293
See application file for complete search history.

(56) References Cited

U.S. PATENT DOCUMENTS

| 5,490,246 | A | 2/1996 | Brotsky |
| 6,522,331 | B1 | 2/2003 | Danks |
| 2003/0076329 | A1* | 4/2003 | Beda et al. .................. 345/557 |
| 2005/0229108 | A1 | 10/2005 | Sadek et al. |
| 2006/0290702 | A1* | 12/2006 | White et al. .................. 345/522 |
| 2006/0290703 | A1* | 12/2006 | White et al. .................. 345/522 |
| 2006/0290704 | A1* | 12/2006 | White et al. .................. 345/522 |
| 2006/0290705 | A1* | 12/2006 | White et al. .................. 345/522 |
| 2007/0008337 | A1* | 1/2007 | White et al. .................. 345/629 |

FOREIGN PATENT DOCUMENTS

| EP | 0977146 | 2/2000 |
| EP | 0977157 | 2/2000 |

OTHER PUBLICATIONS

European Search Report Ref EP56757RK900peu, for Application No. 06790177.7-1243 / 1949210 PCTUS2006034613 Mailed Dec. 9, 2008. 10 Pages.

(Continued)

*Primary Examiner* — Jin-Cheng Wang
(74) *Attorney, Agent, or Firm* — L. Alan Collins; Collins & Collins Incorporated

(57) ABSTRACT

Methods and systems for applying visual effects to active content, such as buttons, comboboxes, video, edit fields, etc., wherein interactivity of the active content are retained thereafter. Also, the present disclosure provides a mechanism for developers to build new visual effects and have them applied to active content.

13 Claims, 8 Drawing Sheets

OTHER PUBLICATIONS

Rector, "Introducing "Longhorn" for Developers—Chapter 3: Controls and XAML", Dec. 2003. Internet article Available at: http://msdn.microsoft.com/en-us/library/aa479869.aspx.

Griffiths, "Avalon ImageEffects and Vector Graphics", Jan. 17, 2004. Online Article, Available at: http://www.interact-sw.co.uk/iangblog/2004/01/17/imageeffects.

Andrade, et al., "Professional WPF Programming: .NET Development with the Windows Presentation Foundation", Apr. 2007. Wiley Publishing, Inc. 10 Pages.

PCT Search Report Ref 314930.03, for Application PCT/US2006/034613, mailed: Jan. 15, 2007.

* cited by examiner

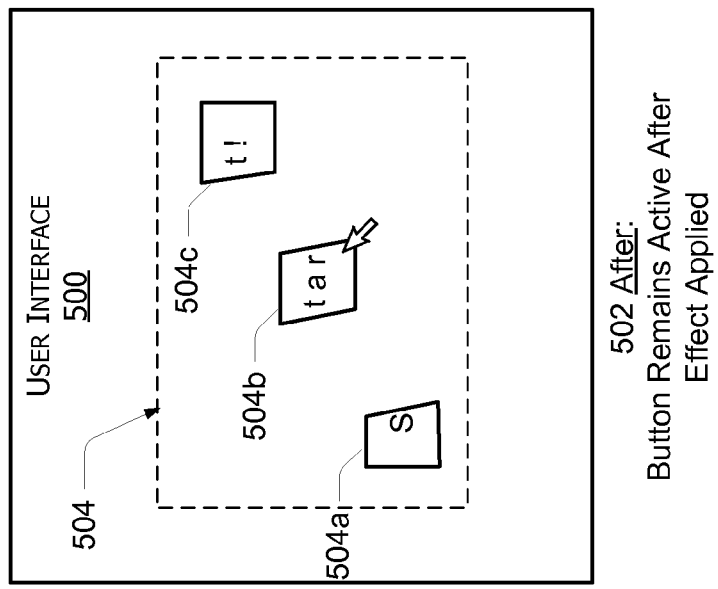
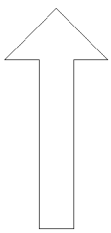
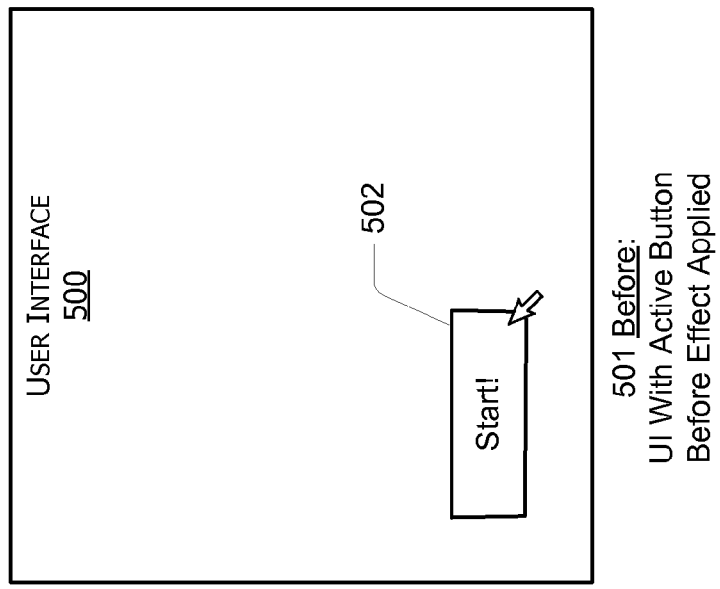
FIG. 5

EXTENSIBLE VISUAL EFFECTS ON ACTIVE CONTENT IN USER INTERFACES

CROSS-REFERENCE TO RELATED APPLICATION

This application claims benefit to U.S. Provisional Patent Application No. 60/716,735, filed on Sep. 13, 2005.

BACKGROUND

Sometimes, application developers desire to implement user interfaces that contain unique elements that distinguish the user interface over other user interfaces and/or to enhance a user's experience when the user is working with the application via the user interface. One way in which a developer may want to customize a user interface is to create visual effects that occur to signal a user interface change or to modify an element of a user interface. However, current platforms do not support applying a visual effect on content that is used as part of a user interface.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present disclosure describes methods and systems for applying visual effects to active content, such as buttons, comboboxes, video, edit fields, etc., wherein interactivity of the active content are retained thereafter. Also, the present disclosure provides a mechanism for developers to build new visual effects and have them applied to active content. Such visual effects, for example, include blur, glow, flash, explode, expand, shrink, fade, gray, swirl, wave, combine, sparkle, or any other visual effect that might be applied to active content.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 5 is a block diagram showing an example button before and after an explosion effect is applied.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computer system, the system described is provided as an example and not a limitation. As those skilled in the art will appreciate, the present examples are suitable for application in a variety of different types of computing and graphics systems.

There are a number of terms used through out this description that are explicitly defined below. The following definitions are meant to supersede any alternative definitions that may be known in the art.

Active content—a visual element, such as a button, combobox, edit field, checkbox, image, video, or the like capable of supporting some form of user interaction or that is animated in some form. Active content may be rendered in memory without being displayed on a screen.

Effect—An Effect is an object that contains an EffectGraph (i.e. a Direct Acyclic Graph (DAG)).

EffectPrimitive—This is a base effect. It does not contain any children. It is what effect developers generally create. This is the object that does the actual pixel processing for the effect.

effect—This term is typically used when either an Effect or an EffectPrimitive may be used or specified.

EffectGraph—This refers to the entire effect graph (i.e. some Effect that is the top most Effect in a DAG of DAGs).

pin—This is used to describe the connection point (via IMILBitmapEffectInputConnector) that an effect exposes for connecting effects together or for other purposes.

Raster graphics—This is the representation of images as a collection of pixels, generally in the form of a rectangular grid or a bitmap. This term is typically used in contrast to the term "vector graphics".

Vector graphics—Also known as geometric modeling, this is the use of geometric primitives such as points, lines, curves, and polygons to represent images in computer graphics. This term is typically used in contrast to the term "raster graphics".

Visual element—This is a graphical construct such as a button, edit field, image, menu, icon, or any other interactive or animated graphical construct rendered in memory or on a display, electronic canvas, user interface, or the like. A visual element may be a raster graphics element, a vector graphics element, or any other type of graphical construct.

Figure 1:
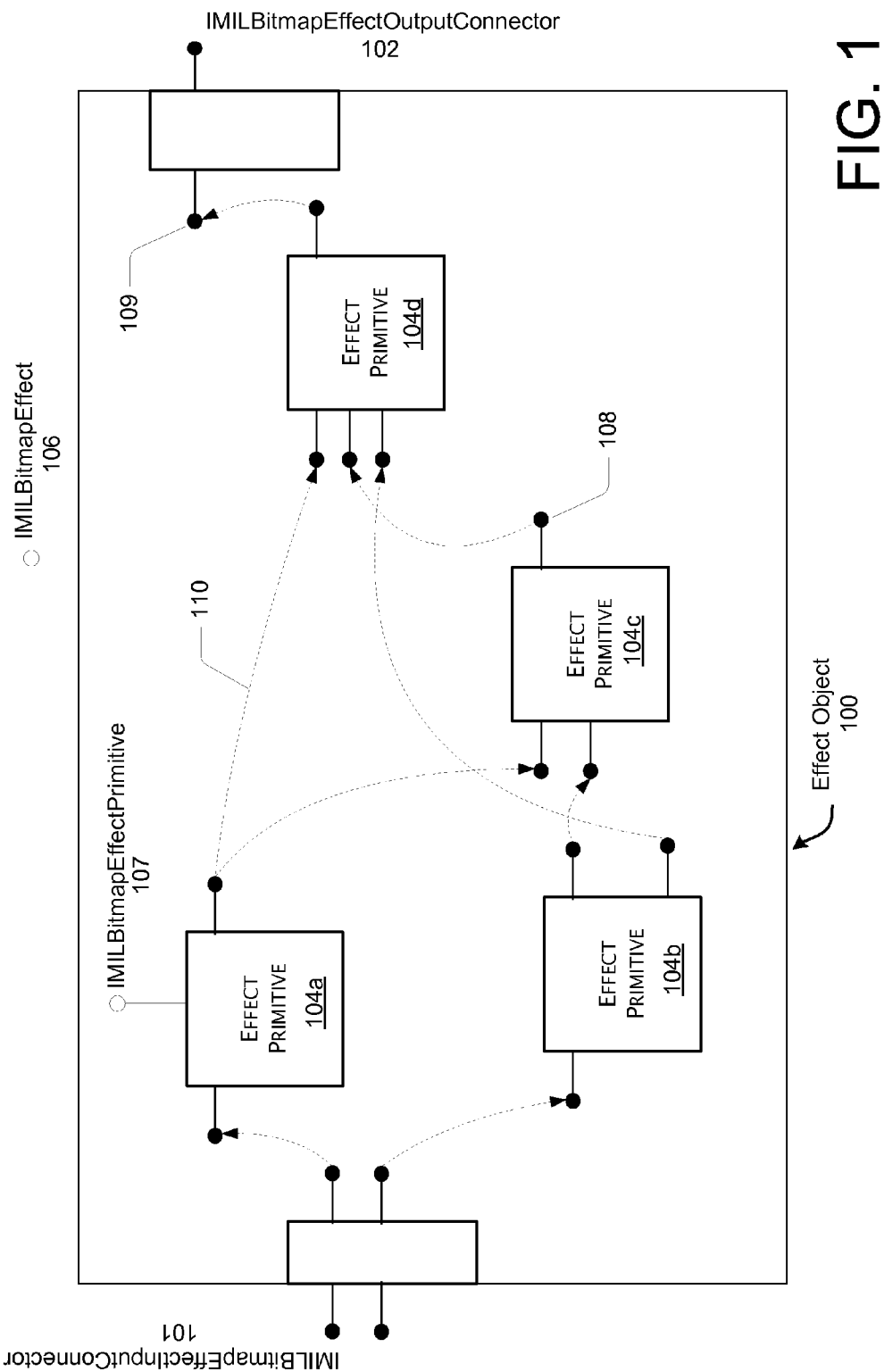
FIG. 1 is a block diagram showing an example Effect object.

FIG. 1 is a block diagram showing an example Effect object 100. An Effect is a collection of one or more EffectPrimitives, such as 104*a*-104*d*, that form a direct acyclic graph (DAG). This effect DAG is typically encapsulated inside a single object 100 that exposes IMILBitmapEffect 106. Each element inside the Effect 100 is either another Effect (i.e. exposes IMILBitmapEffect) or an EffectPrimitive (i.e. exposes IMILBitmapEffectPrimitive 107). Each effect can have 0 or more inputs, such as input 108, and outputs, such as output 109. Each input/output pin is described by an IMILBitmapEffectConnector, such as examples 101 and 102. These are connected together, as by example connection 110, to form the data flow paths through the effect DAG.

Effect 100 may be used to provide a visual effect for active content in bitmap form, including visual elements such as buttons, edit fields, video graphics, or any other interactive or animated visual element(s) of a display, canvas, user interface, or the like. Effect 100 may also be used to apply a visual effect to a bitmap in memory without the bitmap ever being displayed. Further, Effect 100 may surface other properties that describe attributes of its input. For example, BitmapEffect could emit color histogram information or face detection information. The specific effects provided are generally determined by the Effects and EffectPrimitives contained in an Effect, such as example Effect 100.

Typically a bitmap of a visual element is provided at the input of example Effect 100, such as input 101. The input bitmap is processed by Effect 100 to provide an effect (or collection of effects if the Effect includes multiple EffectPrimitives, such as 104a-104d, or other Effects), and a bitmap including the effect(s) is provided at the Effect 100 output, such as output 102.

Figure 2:
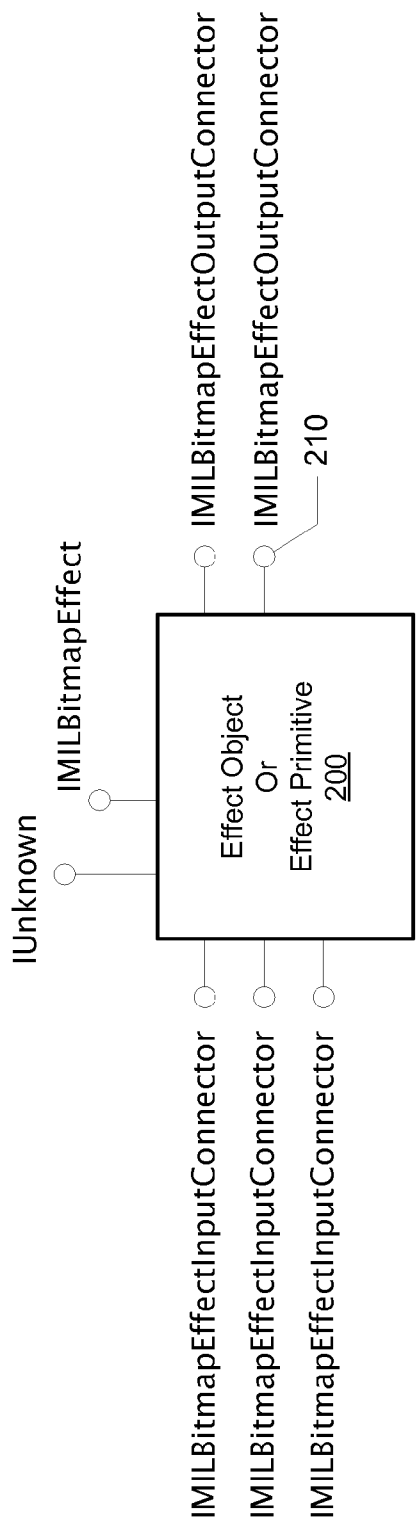
FIG. 2 is a block diagram showing an example effect object including various input and output pins.

FIG. 2 is a block diagram showing an example effect object 200 including various input and output pins. The advantage of exposing a set of input/output pins, such as pin 210, instead of just exposing an output image is that such pins allow querying for the effect's input and output formats and other information without actually running the effect. Each pin may accept/generate images in multiple formats. The formats a pin accepts/generates can be enumerated through the IMILBitmapEffectInputConnector or IMILBitmapEffectOutputConnector interface's GetFormat( ) and GetNumberFormats( ) methods. Each pin may also have an optimal format—the format that the effect would prefer to accept/generate at its input/output. If two connected pins have the same optimal format than that format is typically used. Otherwise, some other matching format is determined, typically based on the initial output format requested at the end of the effect graph. If there is no mutual matching format then a conversion will occur when data flows from the output of one effect to the input of the next effect, as shown in connection with FIG. 3.

Figure 3:
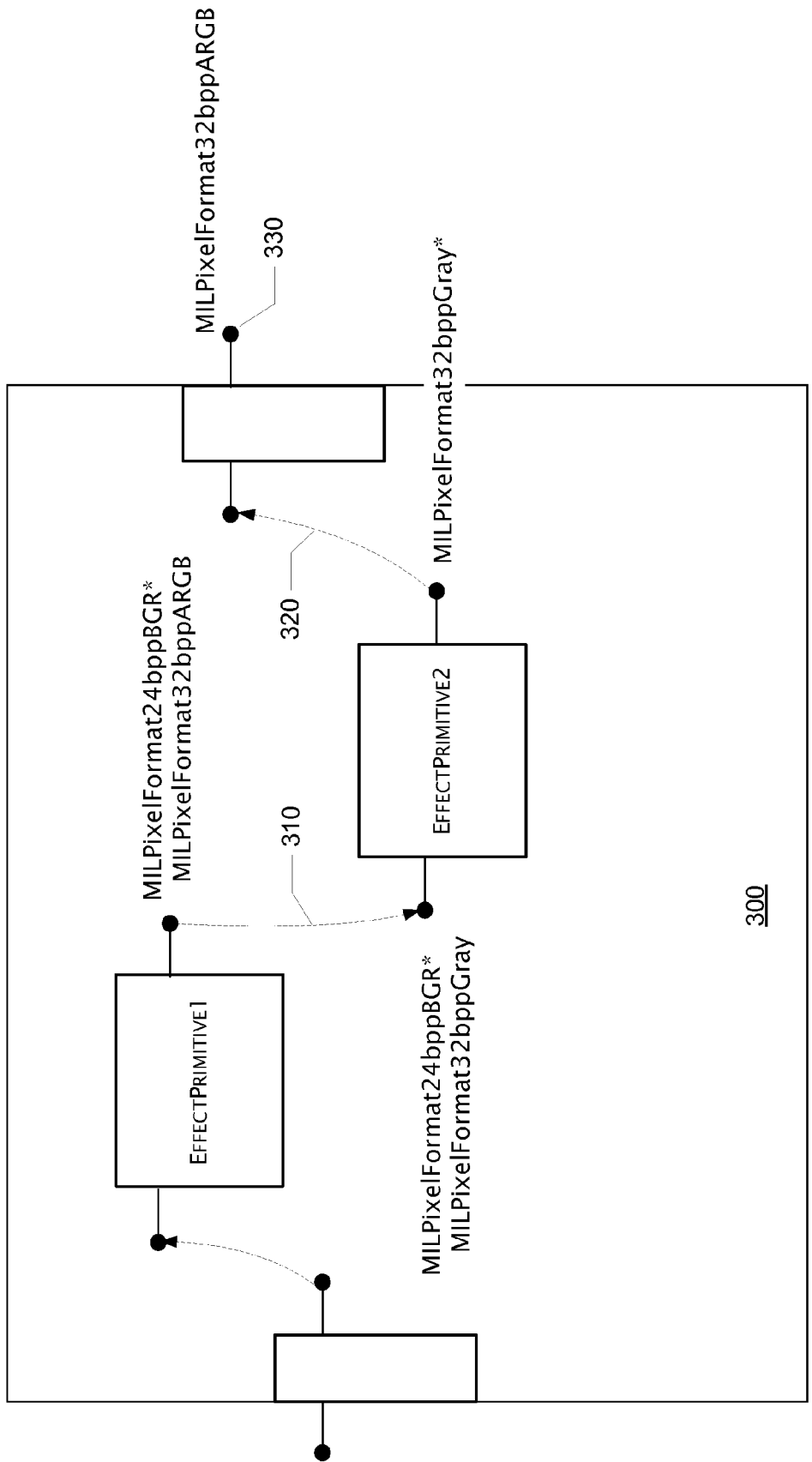
FIG. 3 is a block diagram showing an example effect object containing two EffectPrimitives, each supporting various input and output formats.

FIG. 3 is a block diagram showing an example effect object 300 containing two EffectPrimitives, each supporting various input and output formats. EffectPrimitive1 is shown supporting two output formats, MILPixelFormat24bbpBGR—the optimal output as indicated by the asterisk, and a second output format, MILPixelFormat32 bppARGB, EffectPrimitive2 is shown supporting two input formats, the optimal input format being the same as the optimal output format of EffectPrimitive1's optimal output format. The connection 310 between EffectPrimitive1 and EffectPrimitive2 will not cause a format conversion since they both share an optimal format type of MILPixelFormat24 bppBGR. EffectPrimitive1 will be asked for output in it's optimal format and the result will be passed into EffectPrimitive2.

EffectPrimitive2 is shown supporting a single output format, MILPixelFormat32 bppGray (its optimal format as indicated by the asterisk), and is connected 320 to the single output 330 of effect 300. But the sole output format of effect 300 is MILPixelFormat32 bppARGB, different than the sole output format of PrimitiveEffect2. Therefore, a conversion would occur between the output of EffectPrimitive2 and the entire effect graph's 300 output.

In one example of how format miss-matches are handled, if the optimal formats don't match between the graph and the effect connected to the graph output, then the last requested format (i.e. MILPixelFormat32 bppGray as shown in FIG. 3) will be requested. If the last requested output format doesn't exist as an output of the graph, a random format may be selected.

Each output pin (IMILBitmapEffectOutputConnector) can be linked to an input pin of another effect in the DAG, as long as it preserves the acyclic nature of the graph. This linkage may be 1-to-many (i.e. a single output connection can link to multiple input connections, but not vice versa).

Figure 4:
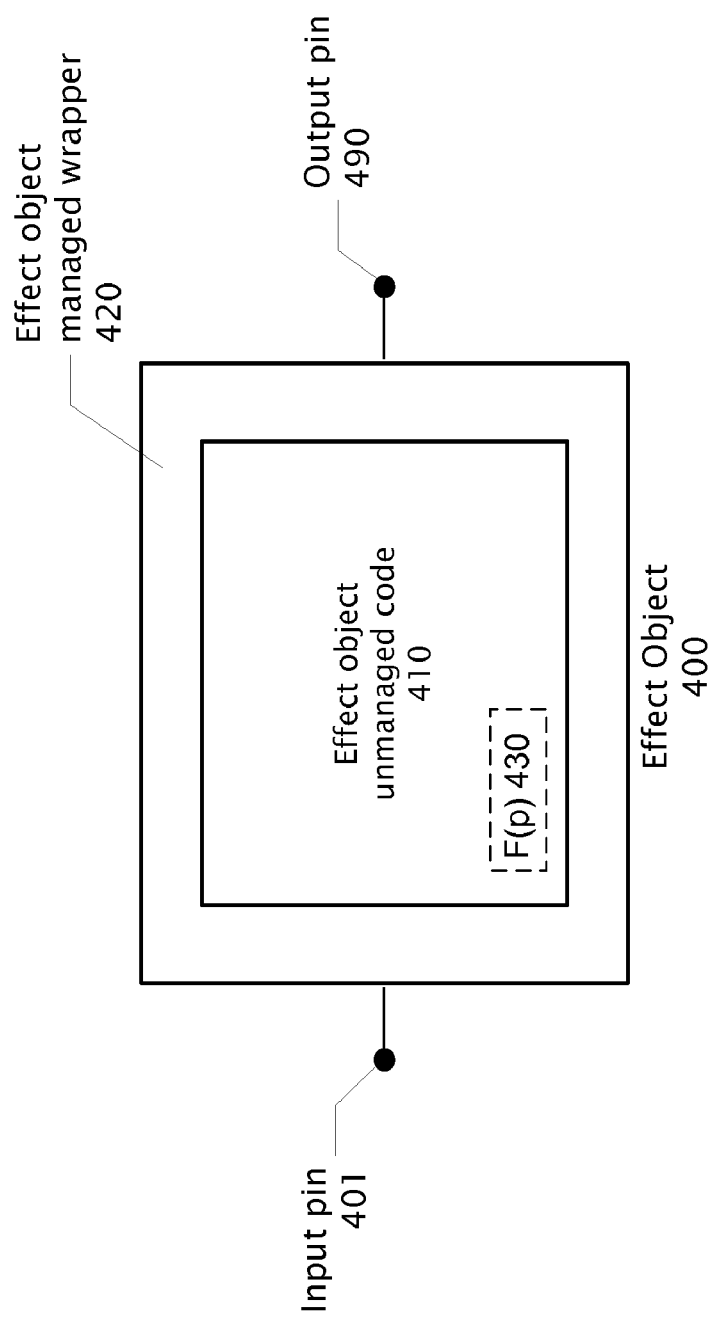
FIG. 4 is a block diagram showing an example effect object.

FIG. 4 is a block diagram showing an example effect object 400. In this example, effect object 400 is comprised of a wrapper 420 built using managed code, such as C# (C sharp), containing an unmanaged implementation of the actual effects code 410, implemented in code such as C++ or the like. Example object 400 includes a single input 401 and a single output 490. In Alternative examples, multiple inputs and/or output may be provided. In the event that format conversion is required or provided, such conversion code is typically included in the wrapper 420. Alternatively, conversion code may be included in the unmanaged code portion 410 or be provided by some other module.

Also included as part of effect object 400 is transformation function F(p) 430. In one example, the transformation function 430 is included as part of the unmanaged code 410. Transformation 430 is the function that transforms the input visual element, typically in the form of a bitmap, to provide the visual element with some new visual effect. In general, such a transformation function 430 may be applied to visual elements that are raster graphic constructs, vector graphic constructs, or the like.

For example, suppose it is desirable to provide a button in a user interface and to have the button "glow" when the mouse if positioned over the button. In such as case, a glow effect object can be created and associated with the button, the transformation function of the glow effect performing the operation on the button bitmap to make it appear to glow. Note that the functionality of the button remains unchanged—only the visual aspects of the button are modified by the effect. That is, the user may still hover the mouse cursor over the button, click on the button, etc and the button behaves as expected.

In a conventional user interface, "hit testing" is typically employed to determine if some user input, such as a mouse click or key stroke, should be applied to a visual element or active content. That is, when the user clicks on a button for example, hit testing code tests the coordinates of the mouse click to determine if the click was made on the button. If so, then the button responds accordingly, such as redrawing itself in the down position, launching the functionality associated with the button, etc.

In the case of a visual effect associated with the button, it is important that hit testing continue to operate as expected. Using the example of a glow effect object, when the mouse cursor hovers over the button, an associated glow effect object may cause the button to take on a glowing appearance. In addition to the glow effect, the button will also highlight due to the mouse-over event as it typically would. And clicking on the button would produce the expected result as well. In one example, an effect object may be associated with a visual element as a property of the element.

FIG. 5 is a block diagram showing an example button before and after an explosion effect is applied. Consider an effect object that produces and explosion effect—breaking the associated visual element into several fragments and spreading them across a user interface over time. FIG. 5 provides a before and after example of such an effect.

In frame 501—the "before" frame, user interface (UI) 500 is shown with conventional button 502 prior to the explosion effect is applied, perhaps as a result of a mouse over event or a click event on the button. Frame 502—the "after" frame, shows the same user interface 500 with the button 504 after the explosion effect is applied. Button 504 is shown broken into three fragments 504a-504c each separated from each other on the UI 500.

The explosion effect is implemented in part by an explosion transformation function mapping each bit of the input button bitmap to new locations, such as in several fragments. Such mappings may change over time, such as in a "moving away" aspect of an explosion, perhaps until the fragments "settle" somewhere on the UI.

Regardless of the transformation, the button continues to operate as expected. That is, the user my click on any fragment of the exploded button 504 and the button will behave as it would if not exploded. This implies that the hit testing code continues to operate as expected. This is facilitated by the user events passing through the Effect object and the transformation function determining if the button was "hit". Typically this is done by solving the transformation function in reverse, or by using a bi-directional transformation function.

Transformation functions may perform affine transforms or non-affine transforms. For example, affine transforms may include magnifying, shrinking, stretching, or rotating a bitmap. Non-affine transforms may include effects such as blur, glow, deform, gray, dim, fade, sparkle, gleam, flash, morph, or any other similar effect wherein elements of the bitmap are added, removed and/or modified in some way. In addition, a transformation function may not translate all of the original bits of an input bitmap, such as when providing the effect of disappearing, shrinking, dropping-out, transitioning to a line or point, or the like. Other possible transforms include swirl, wave, disintegrate, replication, merging multiple bitmaps into one, or the like. In some cases, the effect may result in a bit from an input bitmap being mapped to multiple locations, to an arbitrary location(s), or eliminated altogether. In all of the proceeding examples, the transformation function also provides the ability to indicate if the modified bitmap is "hit" by some user input so as to ensure hit testing functionality continues to operate as expected.

Figure 6:
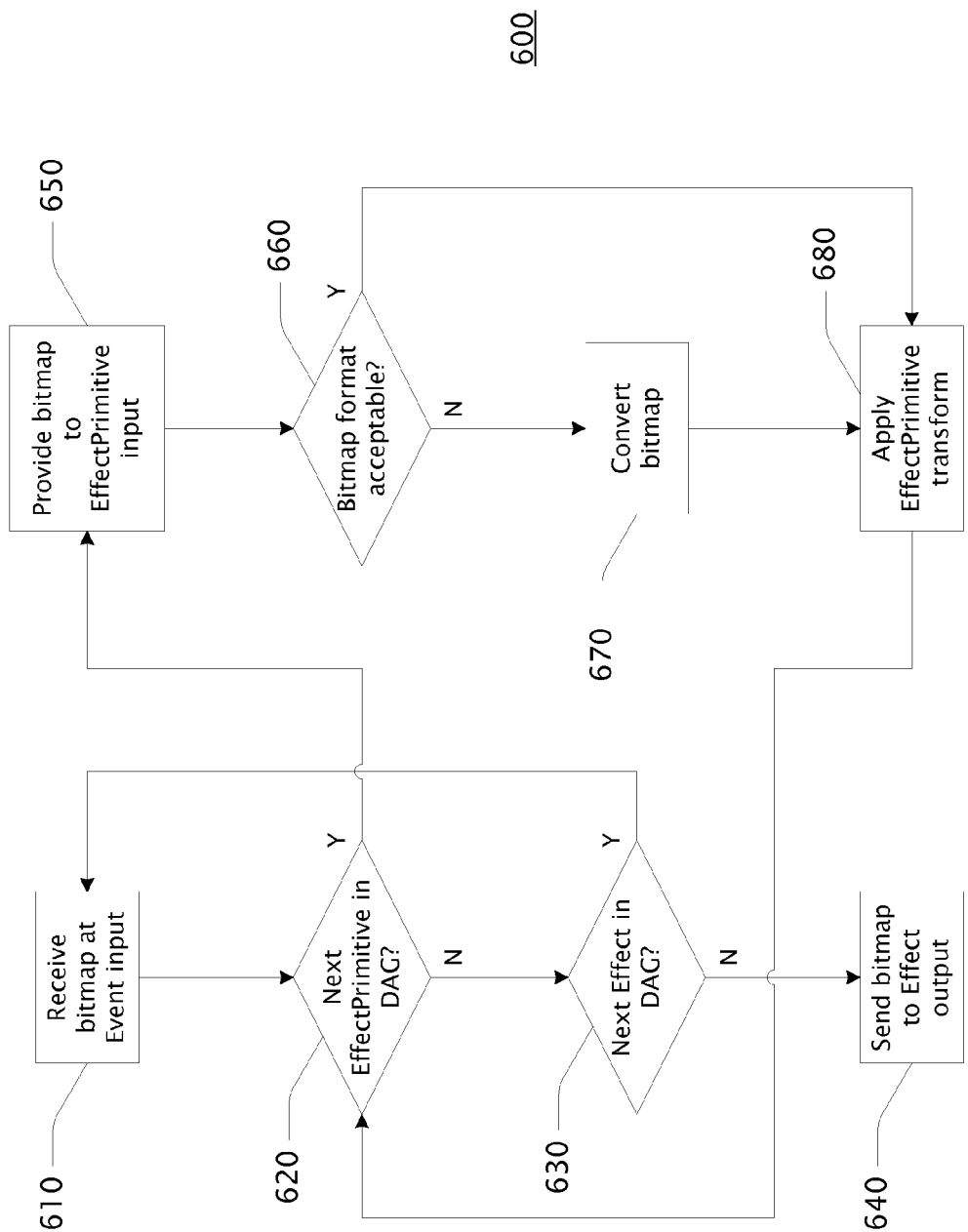
FIG. 6 is a block diagram showing an example method for providing one or more effects to a visual element.

FIG. 6 is a block diagram showing an example method 600 for providing one or more effects to a visual element. An Effect object, such as Effect object 100 shown in FIG. 1 and used in the method 600 description herein below, may make use of such a method 600.

At block 610, method 600 begins with a visual element bitmap being provided at the input of Effect object 100. This may occur via any number of conventional software processes and/or techniques.

At block 620, a test determines if there is a next EffectPrimitive contained in the Effect object 100 DAG to process the bitmap. As shown in FIG. 1, an Effect object may contain EffectPrimitives and/or other Effect objects, one or more of their inputs being connected to the input of Effect object 100, and each output being connected to one or more additional EffectPrimitive and/or Effect inputs, or to the output of Effect object 100. If there is a next EffectPrimitive, method 600 continues at block 650. Otherwise method 600 continues at block 630.

At block 630, a test determines if there is a next Effect object contained in the Effect object 100 DAG. If there is a next Effect object, say "Effect B", then the method continues at block 610 for Effect B. Otherwise method 600 continues at block 640.

At block 640, the input bitmap has completed processing by Effect object 100 and the processed bitmap is provided at the output. This may occur via any number of conventional software processes and/or techniques.

At block 650, the bitmap, which may have been processed by any previous EffectPrimitives and/or Effects, is provided at the input of the next EffectPrimitive. This may occur via any number of conventional software processes and/or techniques.

At block 660, a test determines if the bitmap is in an acceptable format for processing by the EffectPrimitive. If so, then method 600 continues at block 680. Otherwise method 600 continues at block 670.

At block 670, the bitmap is converted of reformatted into an acceptable format for processing by the next EffectPrimitive. In one example, the bitmap may be reformatted into an optimal format.

At block 680, a transformation function, such as transformation function F(p) 430 shown in FIG. 4, is applied to the input bitmap, typically resulting in an effect(s) being applied to the bitmap or a new bitmap being generated from the input bitmap, the new bitmap including the effect(s). Method 600 continues at block 620.

Figure 7:
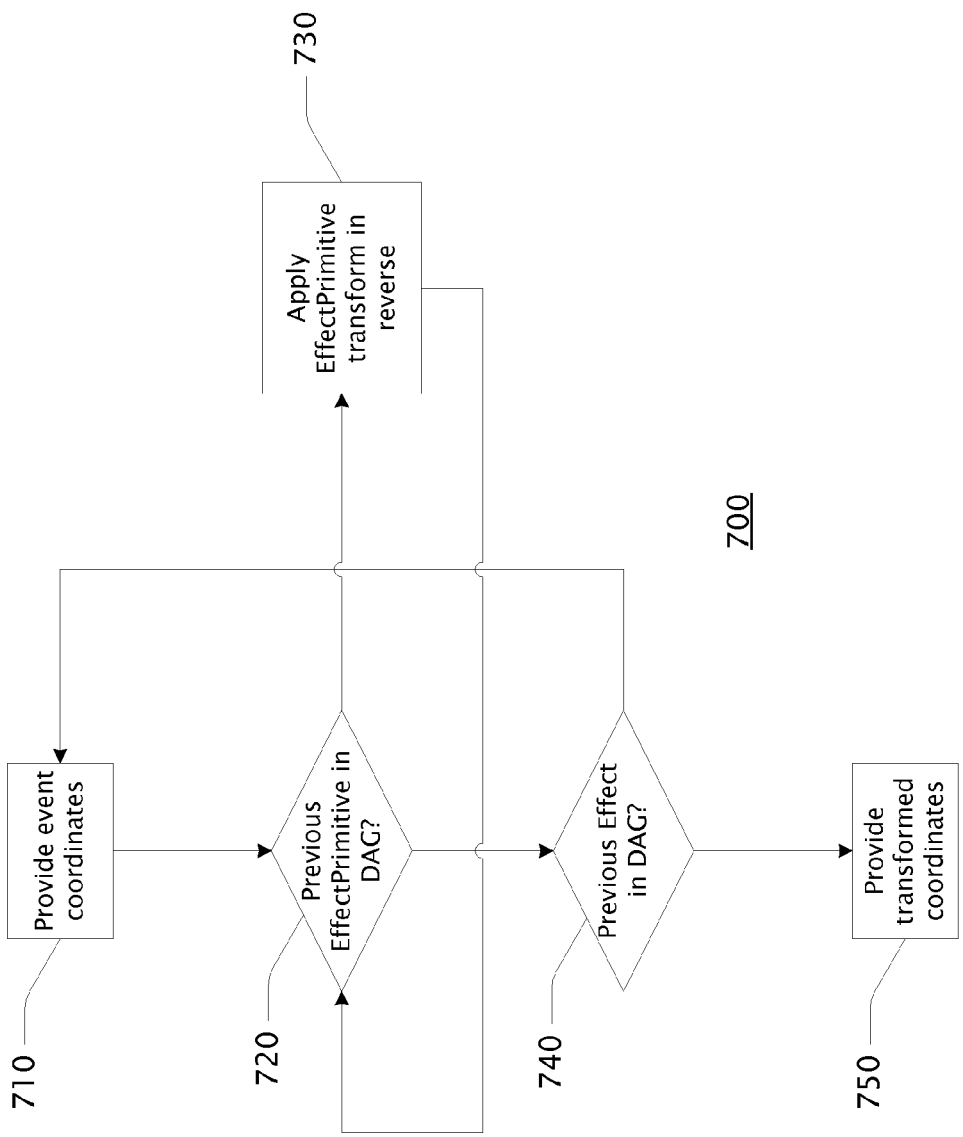
FIG. 7 is a block diagram showing an example method for transforming hit coordinates for accurate hit testing on a visual element with an applied effect(s).

FIG. 7 is a block diagram showing an example method 700 for transforming hit coordinates for accurate hit testing on a visual element with an applied effect(s). Because a visual element with an effect(s) may be positioned on a user interface other than it would be without the effect(s), a transformation of hit coordinates, such as a mouse click or hover-over event, is typically needed to insure proper hit testing. An Effect object, such as Effect object 100 shown in FIG. 1 and used in the method 700 description herein below, may make use of such a method 700.

At block 710, method 700 begins with the coordinates of a user event, such as a mouse click or mouse-over event, being provided to an input of Effect object 100, This may occur via any number of conventional software processes and/or techniques.

At block 720, a test determines if there is a previous EffectPrimitive contained in the Effect object 100 DAG to transform the coordinates. As shown in FIG. 1, an Effect object such as example Effect object 100 may contain EffectPrimitives and/or other Effect objects, one or more of their inputs being connected to the input of Effect object 100, and each output being connected to one or more additional EffectPrimitive and/or Effect inputs, or to the output of Effect object 100. Method 700 begins with the last such effect object in the DAG and works forward to achieve coordinate transformation. A "previous" effect object is an effect object in the DAG starting at the output of the Effect object and working back through any effects objects in the DAG toward the input of the Effect object. For example, EffectPrimitive 104d is previous to Effect Object 100 output 102, EffectPrimitives 104a, 104b and 104c are previous to 104d, and EffectPrimitive 104b is also previous to 104c. If there is a previous EffectPrimitive, method 700 continues at block 730. Otherwise method 700 continues at block 740.

At block 730, a transformation function, such as transformation function F(p) 430 shown in FIG. 4, is applied to the coordinates of the user bitmap, Typically the transformation function is applied in reverse. Method 700 continues at block 720.

At block 740, a test determines if there is a previous Effect object contained in the Effect object 100 DAG. If there is a previous Effect object, say "Effect A", then the method continues at block 710 for Effect A. Otherwise method 700 continues at block 750.

At block 750, method 700 provides the transformed coordinates of the user event to the hit testing code or the like.

Figure 8:
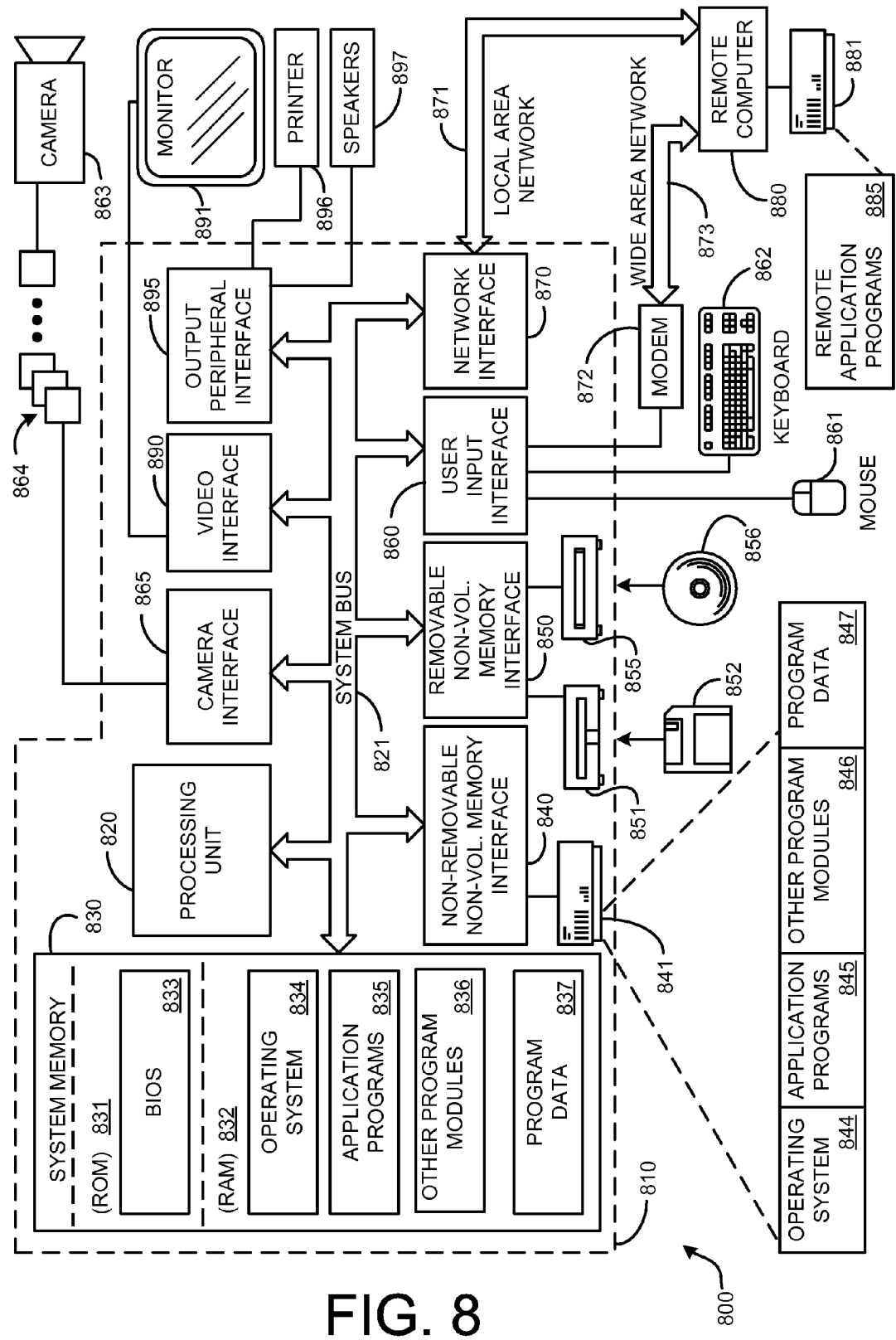
FIG. 8 is a block diagram showing a general purpose computing environment that may be used in one or more implementations according to the present description.

FIG. 8 is a block diagram showing a general purpose computing environment 800 that may be used in one or more implementations according to the present description. The computing system environment 800 is only one example of a suitable computing environment and is not intended to suggest any limitation as to the scope of use or functionality of the claimed subject matter. Neither should the computing environment 800 be interpreted as having any dependency or requirement relating to any one or combination of components illustrated in the exemplary operating environment 800.

The described techniques and objects are operational with numerous other general purpose or special purpose computing system environments or configurations. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The following description may be couched in the general context of computer-executable instructions, such as program modules, being executed by a computer. Generally, program modules include routines, programs, objects, components, data structures, etc. that perform particular tasks or implement particular abstract data types. The described implementations may also be practiced in distributed computing environments where tasks are performed by remote processing devices that are linked through a communications network. In a distributed computing environment, program modules may be located in both local and remote computer storage media including memory storage devices.

With reference to FIG. 8, an example system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures and/or program. Combinations of the any of the foregoing should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVD), digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895. A camera 863 (such as a digital/electronic still or video camera, or film/photographic scanner) capable of capturing a sequence of images 864 can also be included as an input device to the personal computer 810. Further, while just one camera is depicted, multiple cameras could be included as an input device to the personal computer 810. The images 864 from the one or more cameras are input into the computer 810 via an appropriate camera interface 865. This interface 865 is connected to the system bus 821, thereby allowing the images to be routed to and stored in the RAM 832, or one of the other data storage devices associated with the computer 810. However, it is noted that image data can be input into the computer 810 from any of the aforementioned computer-readable media as well, without requiring the use of the camera 863.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

While one or more example implementations have been illustrated and described herein, it will be appreciated that various changes can be made therein without departing from the spirit and scope of the claims appended hereto.

What is claimed is:

1. A method for transforming coordinates of a hit event, the method comprising:

providing a directed acyclic graph including a first effect and a last effect, an input, and an output, the first effect and the last effect each including a bi-directional transformation function $F_F(a)$ and $F_L(z)$ respectively, wherein an input of the first effect is coupled to the input of the directed acyclic graph, and wherein an output of the first effect is coupled to an input of the last effect, and wherein an output of the last effect is coupled to the output of the directed acyclic graph;

displaying a visual element on an area of a display;

transforming the visual element by solving the bi-directional transformation function $F_F(a)$ for (a=the visual element) resulting in a first-transformed visual element;

transforming the first transformed visual element by solving the bi-directional transformation function $F_L(z)$ for (z=the first transformed visual element) resulting in a last-transformed visual element;

displaying the last-transformed visual element instead of the visual element on the display;

receiving the coordinates of the hit event wherein the hit event indicates the displayed last-transformed visual element;

transforming the coordinates by solving the bi-directional transformation function $F_L(z)$ for (z=the coordinates) in reverse resulting in last-transformed coordinates;

transforming the last-transformed coordinates by solving the bi-directional transformation function $F_F(a)$ for (a=the last-transformed coordinates) resulting in first-transformed coordinates; and determining that the first-transformed coordinates identify a point in the area, wherein the method is performed by a computing device.

2. The method of claim 1 wherein the visual element is a bitmap.

3. The method of claim 1 wherein the visual element includes video.

4. The method of claim 1 further comprising converting the visual element to a bitmap.

5. The method of claim 1 wherein the visual element is animated.

6. At least one computer storage device storing computer-executable instructions that, when executed by a computing device, cause the computing device to perform a method for transforming coordinates of a hit event, the method comprising:

providing a directed acyclic graph including a first effect and a last effect, an input, and an output, the first effect and the last effect each including a bi-directional transformation function $F_F(a)$ and $F_L(z)$ respectively, wherein an input of the first effect is coupled to the input of the directed acyclic graph, and wherein an output of the first effect is coupled to an input of the last effect, and wherein an output of the last effect is coupled to the output of the directed acyclic graph;

displaying a visual element on an area of a display;

transforming the visual element by solving the bi-directional transformation function $F_F(a)$ for (a—the visual element) resulting in a first-transformed visual element;

transforming the first transformed visual element by solving the bi-directional transformation function $F_L(z)$ for (z—the first transformed visual element) resulting in a last-transformed visual element;

displaying the last-transformed visual element instead of the visual element on the display;

receiving the coordinates of the hit event wherein the hit event indicates the displayed last-transformed visual element;

transforming the coordinates by solving the bi-directional transformation function $F_L(z)$ for (z—the coordinates) in reverse resulting in last-transformed coordinates;

transforming the last-transformed coordinates by solving the bi-directional transformation function $F_F(a)$ for (a—the last-transformed coordinates) resulting in first-transformed coordinates; and determining that the first-transformed coordinates identify a point in the area, wherein the method is performed by a computing device.

7. The at least one computer storage device of claim 6 wherein the visual element is a bitmap.

8. The at least one computer storage device of claim 6 wherein the visual element includes video.

9. The at least one computer storage device of claim 6 wherein the visual element is animated.

10. A system for transforming coordinates of a hit event, the system comprising:
- a computing device including a display;
- an effect object including an input and an output, the effect object further including a first effect and a last effect each including a bi-directional transformation function $F_F(a)$ and $F_L(z)$ respectively, wherein an input of the first effect is coupled to the input of the effect object, and wherein an output of the first effect is coupled to an input of the last effect, and wherein an output of the last effect is coupled to the output of the effect object;
- the computing device configured to display a visual element on an area of the display;
- the first effect configured to transform the visual element using the bi-directional transformation function $F_F(a)$ for (a=the visual element) resulting in a first-transformed visual element;
- the last effect configured to transform the first transformed visual element using the bi-directional transformation function $F_L(z)$ for (z=the first transformed visual element) resulting in a last-transformed visual element;
- the computing device further configured to display the last-transformed visual element instead of the visual element on the display;
- the computing device further configured to receive the coordinates of the hit event wherein the hit event indicates the displayed last-transformed visual element;
- the last effect further configured to transform the coordinates by solving the bi-directional transformation function $F_L(z)$ for (z=the coordinates) in reverse resulting in last-transformed coordinates;
- the first effect further configured the last-transformed coordinates by solving the bi-directional transformation function $F_F(a)$ for (a=the last-transformed coordinates) resulting in first-transformed coordinates; and
- the computing device further configured to determine that the first-transformed coordinates identify a point in the area.

11. The system of claim 10 wherein the visual element is a bitmap.

12. The system of claim 10 wherein the visual element is animated.

13. The system of claim 10 wherein the visual element includes video.

* * * * *